United States Patent [19]
McFarland et al.

[11] 3,941,459
[45] Mar. 2, 1976

[54] CATOPTRIC LENS ARRANGEMENT

[75] Inventors: Philip J. McFarland, Lynnfield; Werner R. Rambauske, Carlisle, both of Mass.

[73] Assignee: Raytheon Company, Lexington, Mass.

[22] Filed: Feb. 24, 1975

[21] Appl. No.: 552,096

Related U.S. Application Data

[63] Continuation of Ser. No. 376,015, July 2, 1973, abandoned.

[52] U.S. Cl. ........ 350/294; 240/103 R; 240/41.35 C
[51] Int. Cl.² ..................... G02B 5/10; F21V 7/00
[58] Field of Search ........... 350/294, 293, 295, 296, 350/299, 199, 288; 240/41.35 C, 41.35 R, 103 R

[56] References Cited
UNITED STATES PATENTS

| | | | |
|---|---|---|---|
| 2,741,691 | 4/1956 | Lee | 350/294 |
| 3,790,257 | 2/1974 | Goldstein et al. | 350/294 |
| 3,790,258 | 2/1974 | Rambauske | 350/294 |

FOREIGN PATENTS OR APPLICATIONS

| | | | |
|---|---|---|---|
| 676,644 | 7/1975 | United Kingdom | 350/294 |

*Primary Examiner*—Alfred E. Smith
*Assistant Examiner*—Jon W. Henry
*Attorney, Agent, or Firm*—Philip J. McFarland; Joseph D. Pannone

[57] ABSTRACT

Improved catoptric lens arrangements to form beams from the energy emitted by extended sources of wave propagated energy are disclosed. All embodiments utilize at least a pair of mirrors disposed along a common axis, one of such mirrors being convex and the other concave, the generatrices of the reflecting surfaces of such mirrors being curves with coincident focal points, such generatrices being always divergent. At least one source of wave propagated energy is disposed between such reflecting surfaces so that all of the wave propagated energy from such a source is reflected back and forth between the mirrors in passing to an exit aperture defined by the mirrors.

9 Claims, 13 Drawing Figures

CATOPTRIC LENS ARRANGEMENT

CROSS-REFERENCE TO RELATED CASES

This is a continuation of application Ser. No. 376,015, filed July 2, 1973 now abandoned.

BACKGROUND OF THE INVENTION

This invention pertains generally to catoptric lens arrangements and particularly to arrangements of such sort used to direct wave-propagated energy.

For convenience, the following definitions will be used in connection with the catoptric lens arrangements referred to hereinafter.

a. *focal curve* — the locus of the focal point of a generatrix of a reflecting surface when such generatrix is moved relative to a reference line; if the generatrix is rotated, or nutated, about an axis of symmetry not passing through the focal point, the *focal curve* may be referred to as a *focal circle* or *focal arc;* if the generatrix is translated with respect to its axis of symmetry, the *focal circle* may be referred to as a *focal line;* b. *meridional plane* — any cross-sectional plane passed through nonparallel reflecting surfaces having a common axis of symmetry in a manner that such common axis and the normal to the reflecting surfaces at any point on the lines of intersection between the cross-sectional plane and nonparallel reflecting surfaces lie in the cross-sectional plane; if the reflecting surfaces themselves are divergent planes, any cross-sectional plane orthogonal to both reflecting surfaces and to the intersection between such surfaces is a meridional plane;

c. *nonmeridional plane* — any cross-sectional plane passed through nonparallel reflecting surfaces having a common axis of symmetry to intersect such axis at a point, all of the normals to the reflecting surfaces along the lines of intersection between such cross-sectional plane and such nonparallel reflecting surfaces not lying in such plane;

d. *reflection plane* — any plane defined by a ray incident on a reflecting surface and the normal to such surface at the point of incidence; if any particular *reflection plane* is coincident with a *meridional plane*, all rays in that reflection plane may be referred to as *meridional rays* and if any particular *reflection plane* is coincident with a *nonmeridional plane*, all rays in that reflection plane may be referred to as *nonmeridional rays;* e. *ideal ray* — any ray that actually or apparently originates at, or is (after reflection) directed toward, a foacl point or a focal curve of a reflecting surface; if the generatrix of the reflecting surface is a parabola, such a curve is hereinafter deemed to have an imaginary focal point, or focal curve, at infinity;

f. *meridional plane aberration* — the angular difference, in any *meridional plane*, between an *ideal ray* reflected from a point on a reflecting surface and any *meridional ray* reflected from the same point;

g. *nonmeridional plane aberration* — the angular difference, measured in any *reflection plane* coincident with a *nonmeridional plane*, between an *ideal ray* reflected from a point on a reflecting surface and any *nonmeridional ray* in that *reflection plane* and reflected from the same point;

h. *Rambauske mirrors* — at least a pair of mirrors wherein the generatrices of the reflecting surfaces are sections of curves having a focal point moved relative to a reference line to cause the locus of each one of the focal points to be a *focal curve* as defined hereinbefore such mirrors being positioned so that their *focal curves* are coincident, i.e. confocal, or spaced one from another in a predetermined manner.

It is known in the art that a catoptric lens arrangement may be utilized to direct substantially coherent wave-propagated energy, as light in a beam from a laser, in any desired manner (within limits imposed by the effects of diffraction arising out of the finite dimensions of the exit aperture of such an arrangement). Thus, as described in detail in the copending U.S. application of Werner R. Rambauske, entitled "Catoptric Lens Arrangement," Ser. No. 244,393, filed Apr. 17, 1972, (which application is assigned to the same assignee as this application) various diffraction-limited catoptric lens arrangements are shown. The just-cited application shows that a catoptric lens arrangement incorporating at least two confocal Rambauske mirrors may direct a laser beam, or a beam of any type of wave-propagated energy. In particular, the cited application shows that the Rambauske confocal mirrors may have reflecting surfaces whose generatrices are portions of any quadratic conic sections (excepting the circle) rotated or nutated about axes of symmetry not containing both focal points of the selected curve. (As noted hereinbefore in the definition of an ideal ray, if the generatrix is a portion of a parabola, a virtual focal point at infinity may be deemed to be the second focal point). All rays in a beam from an ideal source of coherent wave-propagated energy positioned at one focal point of the entrance mirror in such an arrangement are, therefore, ideal rays which are directed without aberration by such an arrangement.

As noted, the catoptric lens arrangement shown in the cited application is used to direct the rays in a beam from a laser. While such a device may ordinarily be considered to be a completely coherent source, i.e. a point source producing a narrow beam, it is self-evident that a completely coherent source is a physical impossibility. That is, some of the rays from even a laser are not ideal rays. Further, it is obvious that the positioning of a laser so that its beam apparently originates at a focal point of any catoptric lens arrangement may be difficult to achieve. Mispositioning of the laser adds to the deviation of the rays in the beam from ideal.

Fortunately, when a laser is used as a source of coherent light, even the aberrations (if such are significant) caused by the just-mentioned anomalies may be substantially reduced by adjustment of any catoptric lens arrangement using Rambauske mirrors. That is, as described in the cited application, the relative positions of the Rambauske mirrors may be adjusted so that their focal curves are not coincident, but rather are spaced apart along the line between the coherent source and such mirrors. With proper spacing between such mirrors, at least "narrow field" aberrations, i.e. spherical aberration and coma, may be significantly reduced to attain diffraction-limited operation. This is so even though the source may be not perfectly coherent or positioned.

While the just-mentioned method of compensating for narrow field aberrations is effective when light from an almost completely coherent source, as a laser, is passed through any known catoptric lens arrangement using Rambauske mirrors, a different situation obtains when light from an extended source, as an incandescent or a fluorescent lamp, is to be formed into a beam.

That is, because the rays from each different point in an extended source are spatially different, the compensation technique used for eliminating (for all practical purposes) aberrations resulting from inherent characteristics or positioning of any known coherent source may not lead to totally successful results when light from an extended source is to be corrected for aberrations.

When light from an extended source, as a luminescent filament in an incandescent lamp, is to be directed in a beam of any desired shape, it is well known to combine reflective and refractive lens elements to form such a beam. Thus, for example, conventional headlamps for automobiles usually incorporate the combination of a concave paraboloidal mirror and a refractive lens disposed over the exit aperture of such a mirror. An incandescent light is disposed as near the focal point of the concave paraboloidal mirror is possible. Light reflected from such mirror then is directed through the refractive lens, along with unreflected light from the incandescent light. Obviously, because the light finally passing through the refractive lens apparently originates at many different points, a simple refractive lens cannot properly direct all of such light. The refractive lens in a conventional headlamp, therefore, is made up of a number of lenslets, each covering a relatively small portion of the exit aperture of the concave paraboloidal mirror. With such design, each lenslet may be shaped and oriented so that the finally emergent light is directed generally in a desired direction.

Although an acceptable beam may be formed by a conventional automobile headlamp, many difficulties and shortcomings are experienced. For example, light falling on the junction between adjacent lenslets cannot be properly directed. Such light, if permitted to pass without change, contributes to glare in the eye of an observer; on the other hand, if redirected, such light contributes little, if any, illumination in the desired field. Further, because of the curvature of each lenslet, some of the light falling on the surface may be reflected back onto the paraboloidal mirror and, after further reflection, either contribute to glare or be lost. Finally, and probably most important from the point of view of the optical designer, the necessity of using many lenslets, each having its own axis of symmetry but required to redirect rays apparently originating at points on or off such axis, makes it manifest that the optimum design of each one of such lenslets may be, at best, a compromise design. That is, optimum design involves balancing the effects of incorrectible deficiencies, rather than increasing efficiency or providing a better beam.

SUMMARY OF THE INVENTION

It is, therefore, a primary object of this invention to provide an improved catoptric lens arrangement for forming a beam from the light emitted by a source of finite dimensions;

Another object of this invention is to provide an improved catoptric lens arrangement to redirect rays of light emitted by a source not coincidental with a focal point, or focal curve, of any element in such arrangement, such redirection being effective to cause redirected rays to appear to have originated near a focal point, or focal curve, of at least one element in such arrangement;

Another object of this invention is to provide an improved catoptric lens arrangement wherein rays of light, initially in any nonmeridional plane, are redirected so as to approach a meridional plane within such an arrangement;

Another object of this invention is to provide an improved catoptric lens arrangement wherein light is reflected a number, greater than one, of times between a pair of divergent reflecting surfaces so that such reflected light is redirected in an emergent beam; and Still another object of this invention is to provide an improved catoptric lens arrangement as just set forth, such arrangement incorporating Rambauske mirrors with divergent reflecting surfaces, the generatrix of such divergent reflecting surfaces being a portion of selected ones of a family of quadratic conic sections.

These and other objects of this invention are attained generally by providing an extended source of light and at least a pair of Rambauske mirrors with divergent reflecting surfaces and a common focal curve, such source being disposed intermediate such surfaces so that all rays of light from such source are reflected, in passing toward an exit aperture defined by such surfaces, a plurality of times from each one of such surfaces, the direction of each ray emergent from the exit aperture thereby approaching the direction of an ideal ray.

BRIEF DESCRIPTION OF THE DRAWINGS

For a more complete understanding of this invention, reference is now made to the following description of the accompanying drawings, wherein.

DESCRIPTION OF THE PREFERRED EMBODIMENTS

Figure 1:
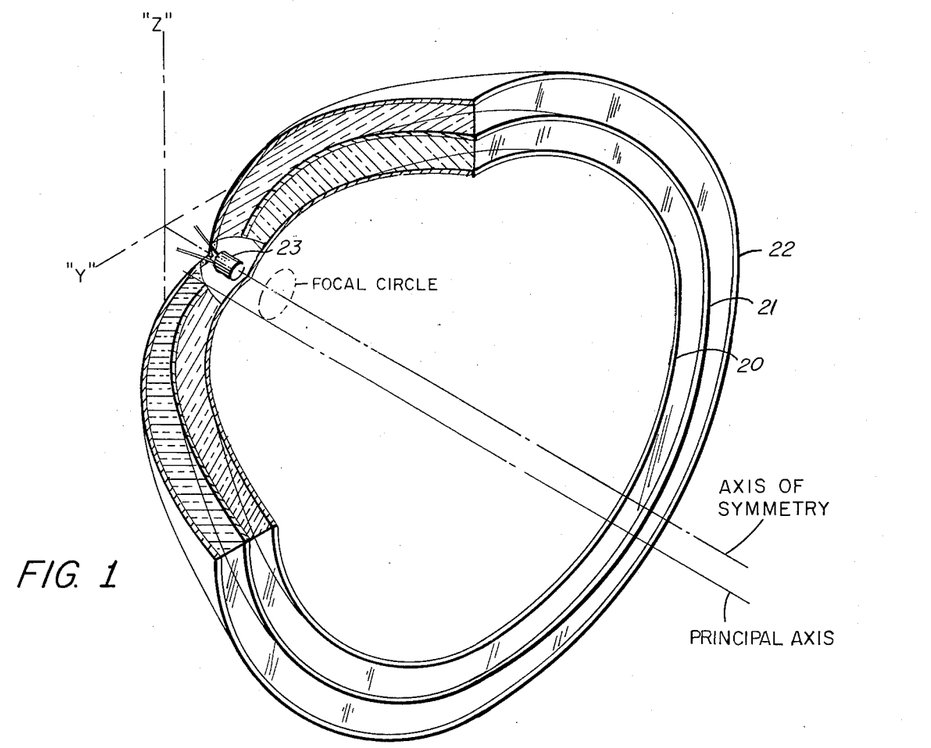
FIG. 1 is an isometric view, partially cut away, illustrating a catoptric lens arrangement according to this invention wherein sections of confocal parabolas are used as the generatrices of the reflecting surfaces and rays from an incandescent filament may be redirected into a beam.

Referring now to FIG. 1, it may be seen that a first embodiment of this invention incudes a number of confocal Rambauske mirrors 20, 21, 22 symmetrically disposed around an axis of symmetry, the common focal curve of such mirrors then being, as indicated, a circle in a plane orthogonal to such axis. As may be more clearly seen in FIG. 1A, the generatrix for the reflecting surface of each one of the Rambauske mirrors is a portion of a parabola (labeled, respectively, in FIG. 1A as parabola A, parabola B and parabola C), rotated about an axis of symmetry parallel to the common principal axis of each such parabola. Rambauske mirrors 20, 22 are, respectively, convex and concave. Both sides of Rambauske mirror 21 are reflective, so that a concave reflecting surface is opposite the convex reflecting surface of Rambauske mirror 20 and a convex reflecting surface is opposite the concave reflecting surface of Rambauske mirror 22. It is apparent, therefore, that the opposing reflecting surfaces are, as viewed from any point between the vertices $V_A$, $V_B$, $V_C$ (FIG. 1A), always divergent.

A light source 23, as an incandescent filament energized from any convenient electrical power supply (not shown) is disposed along the axis of symmetry between the confocal Rambauske mirrors 20, 22. It is noted here in passing that any conventional support structure may be used to position the confocal Rambauske mirrors 20, 21, 22 and the light source 23; here it has been chosen to show such mirrors on the surfaces of nesting laminations of a transparent material, as glass. It should be noted here, however, that the refractive properties of the transparent material are not essential to this invention.

Figure 1A:
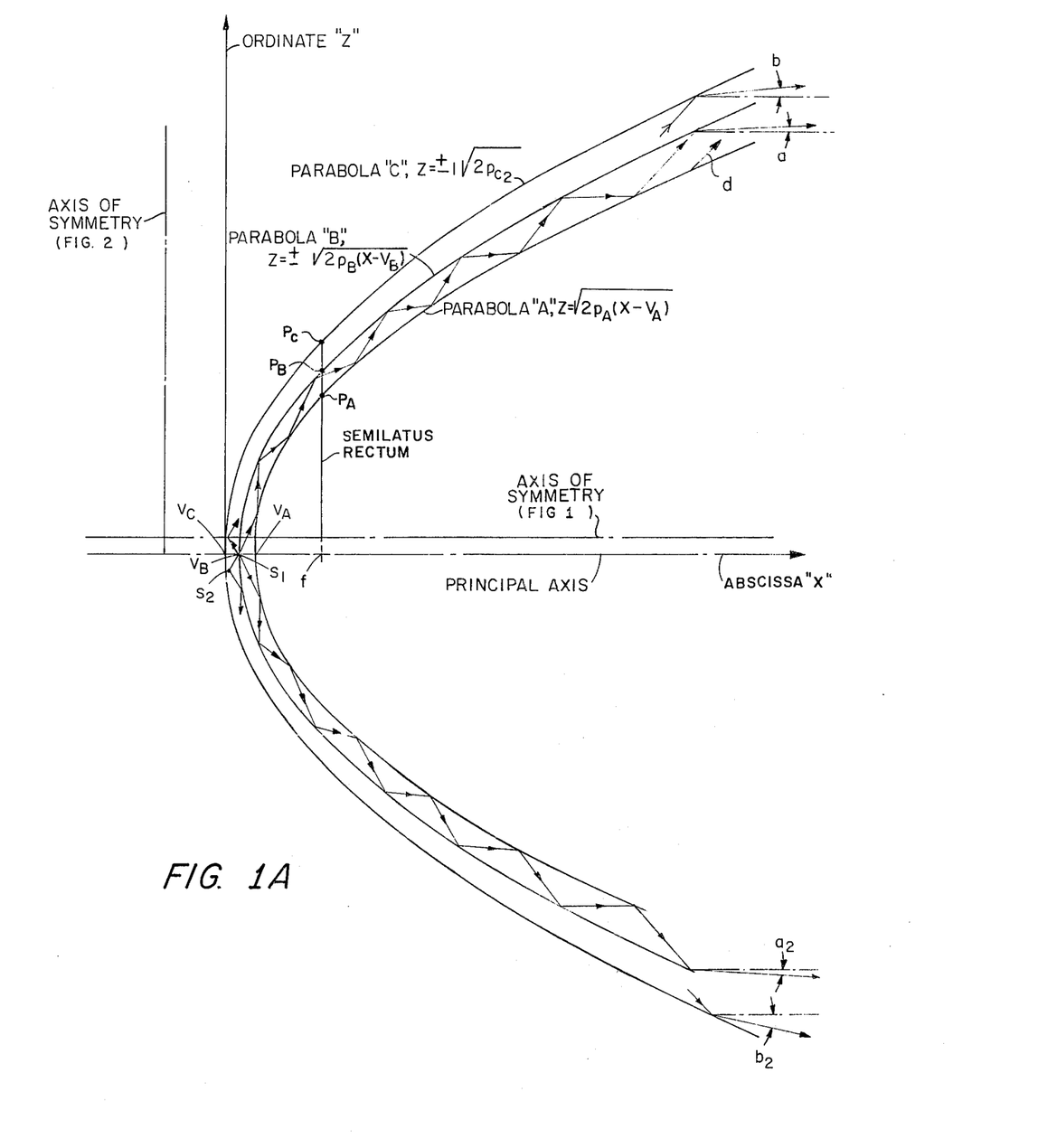
FIG. 1A is a sketch, somewhat expanded, illustrative of any meridional plane of any of the catoptric lens arrangements shown in FIGS. 1, 2, 3 and 4, such sketch showing the manner in which meridional rays are redirected to approach the direction of ideal rays.

Referring now to FIG. 1A, parabolas A, B and C are shown to extend to a common principal axis corresponding to the abscissa X of a set of Cartesian coordinates chosen for such parabolas and, for convenience, only exemplary rays from point sources $S_1$, $S_2$ are shown. It is understood that light from a source of finite dimensions, as the light source 23 of FIG. 1, may be considered to be the summation of the light an infinite number of point sources; the illustrated exemplary rays then are indicative of the effect of confocal parabolic surfaces on meridional rays. Thus, point sources $S_1$ and $S_2$ are shown, respectively, on the principal axis and adjacent to such axis to illustrate the manner in which meridional plane rays are redirected. Taking exemplary rays (not numbered) from source $S_1$ initially inclined to the principal axis at an angle of approximately 60°, it may be seen that such rays are reflected back and forth between parabolas A and B in passing from the source $S_1$ to the exit aperture (not numbered) between such parabolas. At each reflection point, the angle of reflection equals the angle of incidence, such angles being measured with respect to the normal at such point. After each successive reflection from parabola B (a concave surface), the inclination of the reflected ray decreases with respect to the principal axis. In other words, the reflected rays approach parallelism, as indicated by the equal angles $a$, $a_2$, with the principal axis. Also, after each successive reflection to the right of the semilatus rectum (a convex surface), the reflected rays apparently originate from points on the principal axis successively closer to the focal point $f$. To put it another way, the reflected rays change direction after each successive reflection to approach, more and more nearly, the direction of an ideal ray. The meridional plane aberration of finally reflected exemplary rays originating at point source $S_1$ then are represented by the equal angles $a$ and $a_2$.

Exemplary rays (not numbered) from source $S_2$, shown here reflecting back and forth between parabolas B and C, travel along differently curved paths to the exit aperture (not numbered) between such parabolas. For example, the upwardly directed exemplary ray from source $S_2$ (shown initially in the same direction as the upwardly directed ray from source $S_1$) ultimately emerges from between the parabolas B and C at an angle $b$ with respect to an ideal ray. The initially downwardly directed exemplary ray from source $S_2$ ultimately emerges from between the parabolas B and C at an angle $b_2$ with respect to an ideal ray, such angle being somewhat greater than the angle $b$.

It should be noted here that ideal rays from source $S_1$ and ideal rays from source $S_2$ (meaning the rays initially directed toward or away from the focal point, $f$) are reflected in different ways. Thus, because the ideal rays from source $S_1$ and the normals to the parabolas A and B are coincident, the ideal rays from source $S_1$ are simply reflected back and forth between the vertices $V_A$, $V_B$. Because the ideal rays from source $S_2$ are not, however, coincident with the normals to the parabolas B and A, such rays ultimately pass, without changing from their ideal state, from between parabolas B and C.

From the foregoing it may be deduced that, with an extended source of light on the common principal axis of any pair of confocal parabolas, any finally reflected meridional ray emerging from between such parabolas is, in theory, aberrant to some degree. On the other hand, under the same conditions except that the source is spaced from the common principal axis, initially aberrant meridional rays emerge with slightly greater aberration than would be the case if the source were on the principal axis, but, in such a case, there are ideal rays in the emergent beam.

It will be noted that, if the confocal parabolas have (as shown in the upper half of FIG. 1A) the same length, the direction of rays emerging from between such parabolas depends upon which one of the surfaces last reflects the rays. That is, all rays last reflected from the concave surface of parabola B are generally parallel to the principal axis; all rays (as ray $d$) last reflected from the convex surface of parabola A are in a divergent beam apparently originating near the focal point $f$.

If it is desired that only rays generally parallel to the principal axis emerge from between confocal parabolas the length of the parabolas may be progressively changed as shown in the lower half of FIG. 1A. All rays emerging from between such confocal parabolas are last reflected from a concave surface; on the other hand, if it is desired that only rays apparently originating near the focal point be permitted to emerge, then the lengths of the parabolas would be changed oppositely. In either case, a refractive lens may be disposed in the path of the emergent beam. Because, as noted hereinbefore, it is not essential to this invention that any refractive lens element be used, no such element is shown.

It will be evident from inspection of FIG. 1A that the angular deviation of any ray from an ideal ray is dependent upon the number of reflections to which the ray is subjected in passing from either $S_1$ or $S_2$. A moment's thought will make it clear that the number of reflections may be increased by lengthening the parabolas, i.e. increasing their X dimensions, or by decreasing the distance between opposing reflecting surfaces, i.e. decreasing the difference between the lengths of the semilatus rectums of successive parabolas. Diffraction limiting of the emergent beam may, however, be experienced if the spacing between successive parabolas is made too small. In any event, for any pair of concave and convex confocal parabolic reflecting surfaces it may be shown that:

a. for any emergent ray last reflected from a concave reflecting surface, $$e = i + 2[C_{x1} + C_{x2} \ldots C_{xn}] - 2[C_{v1} + C_{v2} \ldots C_{vn}];$$ and b. for any emergent ray last reflected from a convex reflecting surface, $$e = (180 - i) + 2[C_{x1} + C_{x2} \ldots C_{xn}] - 2[C_{v1} + C_{v2} \ldots C_{vn}]$$

where $e$ is the angular deviation of the emergent ray from an ideal ray;

$i$ is the initial inclination of the emergent ray with respect to the principal axis;

$C_{x1}, C_{x2} \ldots C_{xn}$ is the acute angle between the normal at each successive reflection point on the convex reflecting surface and the principal axis; and $C_{v1}, C_{v2} \ldots C_{vn}$ is the acute angle between the normal at each successive reflection point on the concave reflecting surface and the principal axis.

For parabolas A and B of FIG. 1A (assuming $V_B$ the origin,)

$$C_x = \tan^{-1} [2PA (x - (V_B - V_A))]^{1/2}/PA$$
$$C_v = \tan^{-1} [2 PB x]^{1/2}/PB$$

Figure 1B:
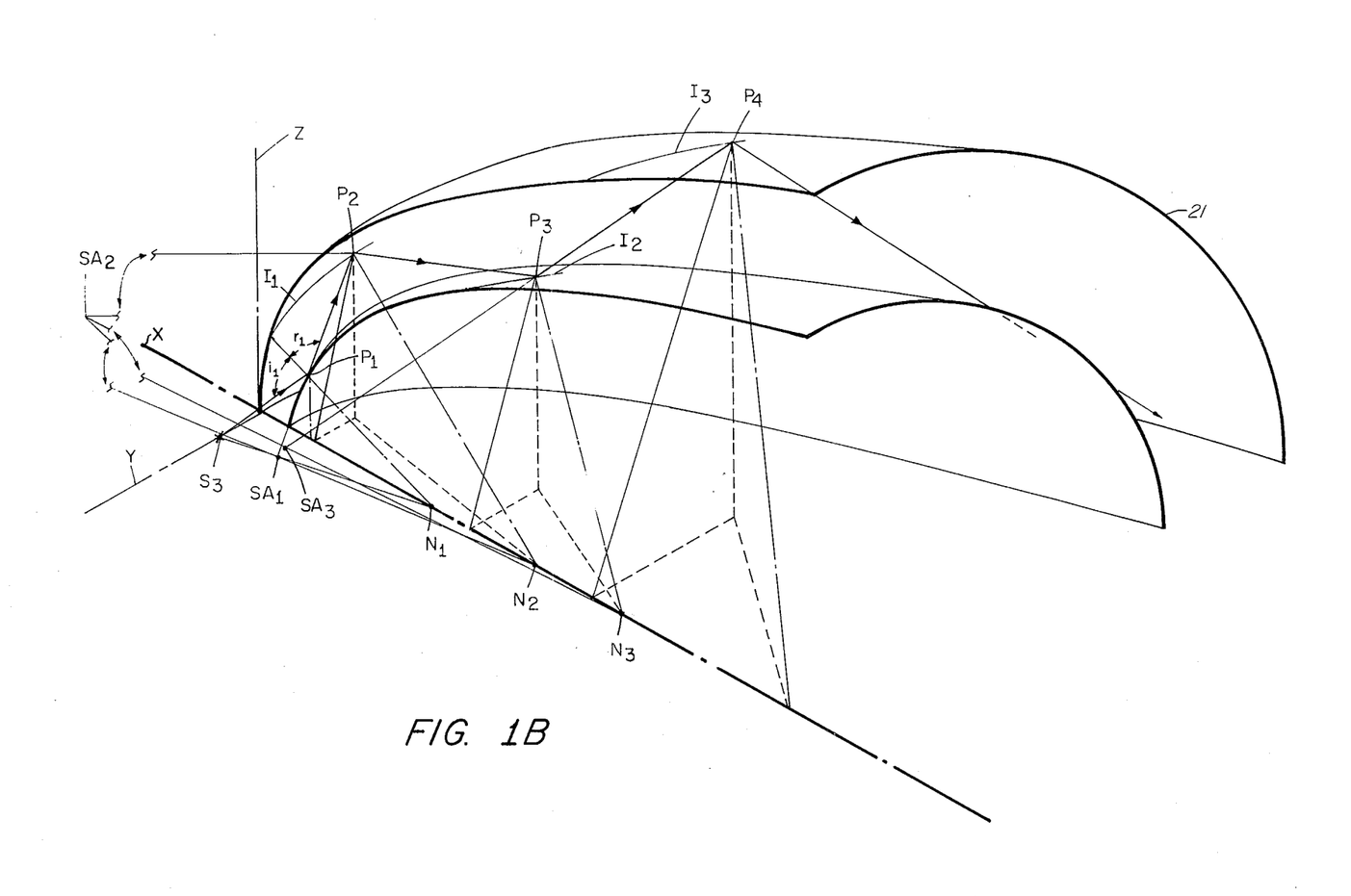
FIG. 1B is a sketch, somewhat expanded, of the path of an exemplary nonmeridional ray within any of the catoptric lens arrangements shown in FIGS. 1, 2, 3 and 4, such sketch showing in particular the manner in which the reflection plane in which such ray lies changes, with each successive reflection, to approach a meridional plane.

Before referring in detail to FIG. 1B, it should be noted that FIG. 1A illustrates two confocal paraboloids rather than two confocal Rambauske mirrors. Such a difference is, however, immaterial in that confocal mirrors of both types are similar in operation when initially nonmeridional rays are reflected back and forth in passing from a source to the exit aperture. For this reason and because confocal paraboloids are more easily and clearly illustrable, confocal paraboloids are shown. It should also be noted in respect to FIG. 1B that the XY plane is the meridional plane for any ray from the illustrated source. Any such ray is, therefore, reflected in the same manner as described in connection with FIG. 1A.

Referring now to FIG. 1B, it may be seen that, in accordance with this invention, the direction of initially nonmeridional rays are caused to approach the direction of meridional rays. That is, multiple reflections between a pair of confocal Rambauske mirrors causes the direction of an initially nonmeridional ray to be changed asymptotically toward the direction of a meridional ray. Thus, considering an exemplary nonmeridional ray from a source $S_3$ (such source here being for convenience shown to be located at a point on the Y axis of a set of Cartesian coordinates), such ray is first reflected at a point $P_1$, in the XZ plane, on Rambauske mirror 20. The reflection plane is, initially, defined by the normal $P_1N_1$ and the ray $S_3P_1$. This first reflection plane intersects the XY plane along the line $S_3N_1$ and the Rambauske mirror 21 along a curved line, a portion of which is indicated as $I_1$. The just-mentioned curved line is ovate, one point thereon being the intersection of the normal $P_1N_1$ (extended) with the Rambauske mirror 21 and two other points thereon being the intersections, in the XY plane, of the line $S_3N_1$ with such mirror. Because the ray reflected from $P_1$ lies in the first reflection plane, such reflected ray must intersect the curved line $I_1$. The exact point of such intersection, $P_2$, is dependent upon the angle of incidence, $i_1$, of the ray from $S_3$ with respect to the normal $P_1N_1$. As in every case of reflection, the angle of reflection, $r_1$, equals the angle of incidence, $i_1$. Thus, in the first reflection plane, the direction of the ray from $P_1$ to $P_2$ is determined. Such ray, when projected toward the XY plane, appears to have come from $SA_1$.

The normal at $P_2$, $P_2N_2$, and the ray apparently originating at $SA_1$ define a second reflection plane. Such plane intersects the XY plane along the line $SA_1N_2$ and the Rambauske mirror 20 along an ovate line, a portion of the latter being indicated by $I_2$. The ray reflected from $P_2$, because such ray also lies in the second reflection plane, intersects $I_2$ at $P_3$. Also, such ray apparently originates from a point $SA_2$ on the line $SA_1N_2$ in the XY plane.

The normal at $P_3$, $P_3N_3$, and the ray from $P_2$ define a third reflection plane. Such third reflection plane intersects the XY plane along line $SA_2N_3$ and the Rambauske mirror 21 along an ovate line, a portion of which is indicated as $I_3$. The ray reflected from $P_3$ appears to have originated at point $SA_3$, the intersection of the ray reflected from point $P_3$ (projected back to the XY plane) and the line $SA_2N_3$. Such ray and the normal $P_4N_4$, in turn, define a fourth reflection plane in which the ray reflected from $P_4$ lies. It will be observed that the intersection of each successive reflection plane and the XY plane more and more closely approaches the X-axis and that each successive reflection plane is more nearly aligned with the XY plane. In connection with the latter point it will be observed that, at each successive reflection point after the first $P_1$, the inclination of the normal to the XY plane decreases sinusoidally. It follows then that the reflection plane, after a number of reflections, approaches the XY plane asymptotically. This concept may be made clear by considering the situation which would obtain if, after several reflections, the reflection plane were deemed to be such that the exemplary ray in FIG. 1B (sometimes now to be referred to as the "assumed" ray) could pass through the XY plane in passing from one mirror to the other. Upon incidence on either mirror in such a case, the new reflection plane would be defined by the assumed ray and a normal which runs from a point below the XY plane to a point on the X-axis. Such a normal would differ in this respect from any shown in FIG. 1B (where the normals at all reflection points run from a point above the XY plane to a point on the X axis). Such a difference in the orientation of the normals, in turn, leads to an anomolous result: namely that changes in the orientation between successive ones of the resulting reflection planes, whether the ray is incident on a concave or a convex reflecting surface, are opposite in sense than illustrated in FIG. 1B. That is, if the assumed ray penetrating through the XY plane is incident on either a concave or a convex reflecting surface, the intersection of the resulting reflection plane and the XY plane is defined by the point at which the assumed ray penetrates the XY plane and the intersection of the normal with the X axis. The X coordinate of the latter point is greater than the X coordinate of the former and the point of penetration of the assumed ray through the XY plane lies on the opposite side of the X-axis from either the source $S_3$ or any of the apparent sources $SA_1$, $SA_2$, $SA_3$ illustrated in FIG. 1B. The angle between the intersections of successive reflection planes of the assumed ray and the X-axis would therefore decrease oppositely to the angles shown in FIG. 1B. Such a situation is, however, not possible because it would mean that the change in direction of the assumed ray with respect to the XY plane is opposite in sense to the direction of the illustrated ray in FIG. 1B.

Figure 2:
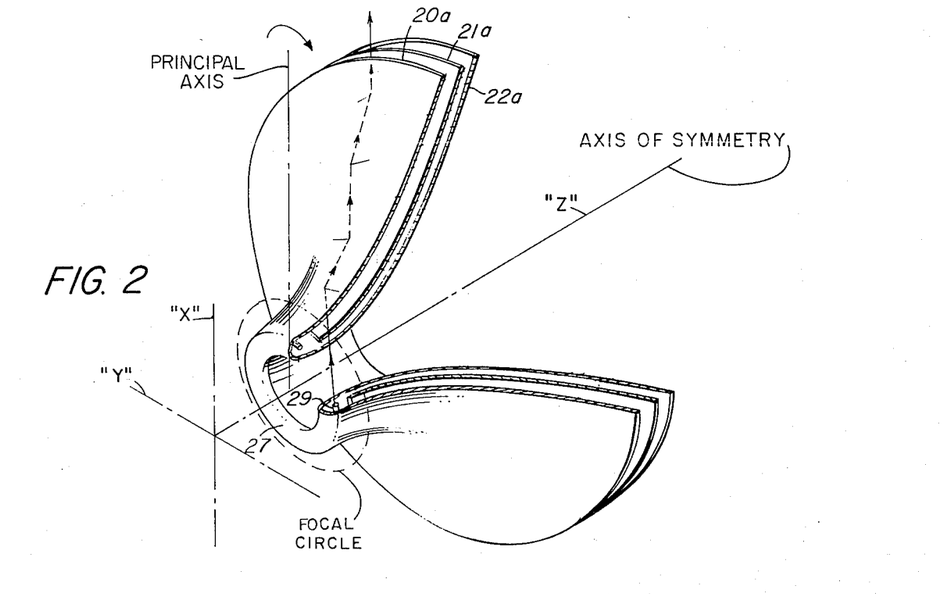
FIG. 2 is an isometric view, partially cut away, illustrating an alternative embodiment of this invention for use with a ring source of light, as a fluorescent lamp.

Referring now to FIG. 2, it may be seen that if a portion of the confocal parabolas shown in FIG. 1A (say the portion of each such parabola above the line marked "Axis of Symmetry, FIG. 1") is rotated about the line marked "Axis of Symmetry, FIG. 2" such curves would be the generatrices of three Rambauske mirrors 20a, 21a, 22a with a common focal circle orthogonal to such axis. A conventional half-ring mirror 27 is affixed in any convenient manner to Rambauske mirrors 20a, 22a to bridge the gap therebetween. A ring source of light, as a fluorescent lamp 29, is disposed in any convenient manner in a position adjacent to the junction between the half-ring mirror 27 and the Rambauske mirrors 20a, 22a. It is noted here that the position of the fluorescent lamp 29 is not critical. It is noted here further that, in FIG. 2, and in the remaining Figures illustrating other embodiments of this invention, supporting structure for the various mirrors and light sources and power connections are not shown. It is deemed obvious, especially in view of FIG. 1, that such structure and connections may be provided in any convenient way.

All rays of light from the fluorescent lamp 29 fall either on the half-ring mirror 27 or on the reflecting surface of one of the Rambauske mirrors 20a, 21a, 22a. The light falling on the half-ring mirror 27 is reflected therefrom and directed in a known manner toward the Rambauske mirrors 20a, 21a, 22a. Thus (neglecting losses due to reflections) it may be considered that all light from the fluorescent lamp 29 is reflected back and forth between the Rambauske mirrors 20a, 21a, 22a, finally to reach the apertures between such mirrors.

Light initially in any meridional plane of the Rambauske mirrors 20a, 21a, 22a is reflected back and forth in the manner described hereinbefore in connection with the description of FIG. 1A. Because, however, the principal axis of the generatrix of each one of the Rambauske mirrors 20a, 21a, 22a lies in a plane orthogonal to the axis of symmetry: (a) the meridional rays in the emergent beam last reflected from a concave Rambauske mirror lie in planes approximately parallel to such plane; and (b) meridional rays in the emergent light last reflected from a convex Rambauske mirror are divergent, apparently originating at points adjacent to the focal circle. As noted in connection with the description of FIG. 1A, the lengths of the Rambauske mirrors 20a, 21a, 22a here may be made different to adjust the amount of light in either of the beams from the illustrated arrangement.

Initially nonmeridional rays reflected back and forth between the Rambauske mirrors 20a, 21a, 22a (as illustrated by the exemplary ray, not numbered, in FIG. 2) are caused to approach, in the manner discussed hereinbefore in connection with FIG. 1B, meridional rays. That is, after each reflection, the reflection plane of any initially nonmeridional rays more nearly approaches a meridional plane. Therefore, the Rambauske mirrors 20a, 21a, 21b are effective finally to direct initially nonmeridional rays in substantially the same manner as meridional rays, i.e. to cause the final direction of all emergent rays to approach the direction of ideal rays.

Figures 3, 3A:
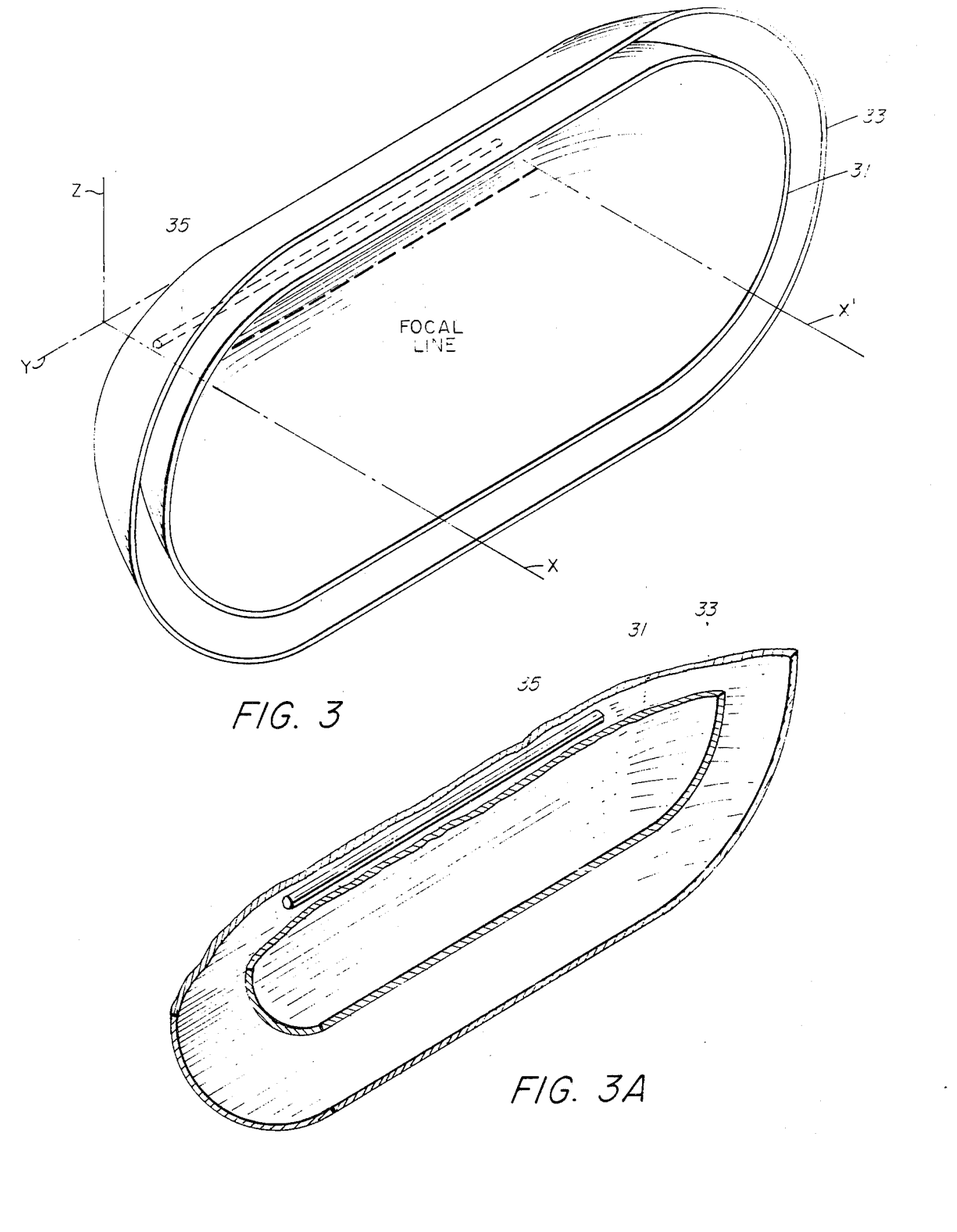
FIG. 3 is an isometric view of a catoptric lens arrangement according to this invention wherein selected portions of confocal parabolas are translated and rotated to become the generatrices of reflecting surfaces adapted to direct meridional and nonmeridional rays from a line source of light.
FIG. 3A is a partial view of the catoptric lens arrangement shown in FIG. 3 to illustrate the position of a line source between two reflecting surfaces.

Referring now to FIGS. 3 and 3A, it may be seen that Rambauske mirrors having focal lines may also be adapted to direct light according to this invention. Thus, a pair of confocal Rambauske mirrors 31, 33, the generatrices of the reflecting surfaces of such mirrors being a pair of confocal parabolas, are translated along a line to form the upper and lower portions of such mirrors and are rotated about the ends to form the end portions of the illustrated Rambauske mirrors. A light source, as a fluorescent lamp 35, is disposed between the Rambauske mirrors 31, 33, such lamp being approximately parallel to the focal line.

It will be noted that meridional planes passing through the arrangement shown in FIG. 3 are, in the upper and lower portions between lines X and $X^1$, parallel to each other and to the XZ plane and, in the end portions, correspond to opposite halves of the arrangement shown in FIG. 1. Rays of light passing through the end portions are, therefore, directed in the same manner as rays, whether meridional or nonmeridional, in the arrangement shown in FIG. 1. Meridional rays through the upper and lower portions of the Rambauske mirrors 31, 33 are reflected in the same manner as shown in FIG. 1A. The reflection planes of initially nonmeridional rays through the upper and lower portions of the Rambauske mirrors 31, 33 become, after each reflection, more and more closely parallel to the XZ plane, i.e. are more and more closely aligned with a vertical meridional plane. Finally, those nonmeridional rays that may pass from the upper or lower portions of the Rambauske mirrors 31, 33 to either end portion are directed in the same manner as rays in the arrangement shown in FIG. 1.

Figure 4:
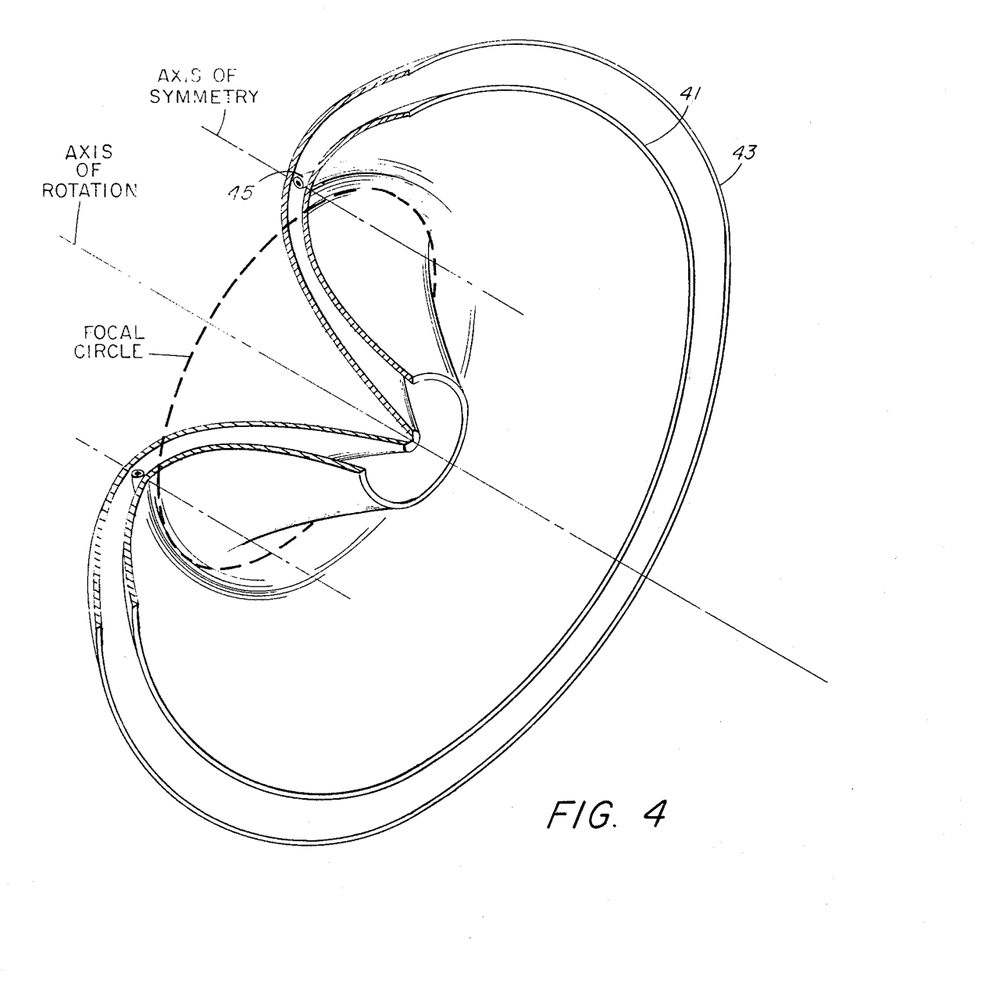
FIG. 4 is an isometric view, partially cut away, of an alternative embodiment of confocal Rambauske mirrors to redirect rays from a ring source to form emergent beams.
Figure 4A:
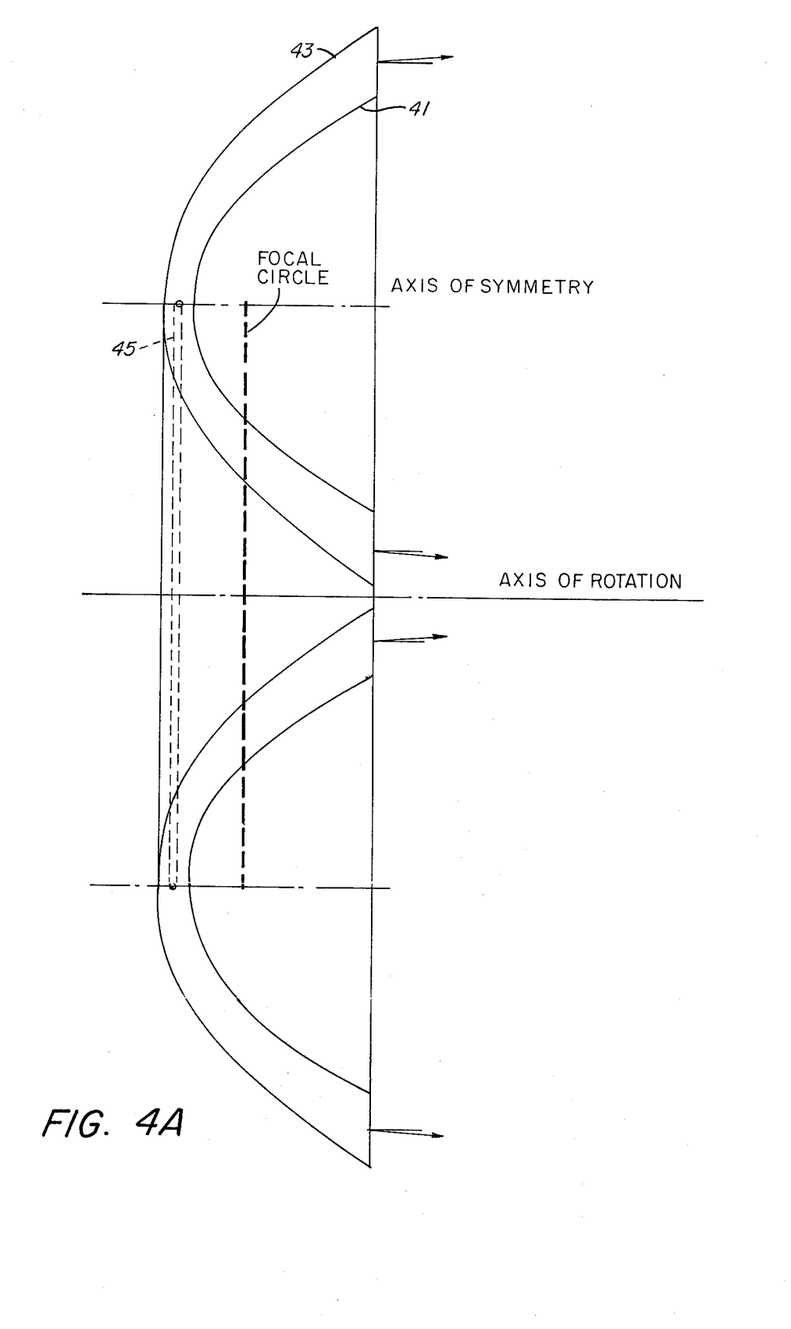
FIG. 4A is a front view of the alternative embodiment shown in FIG. 4.
Figure 4B:
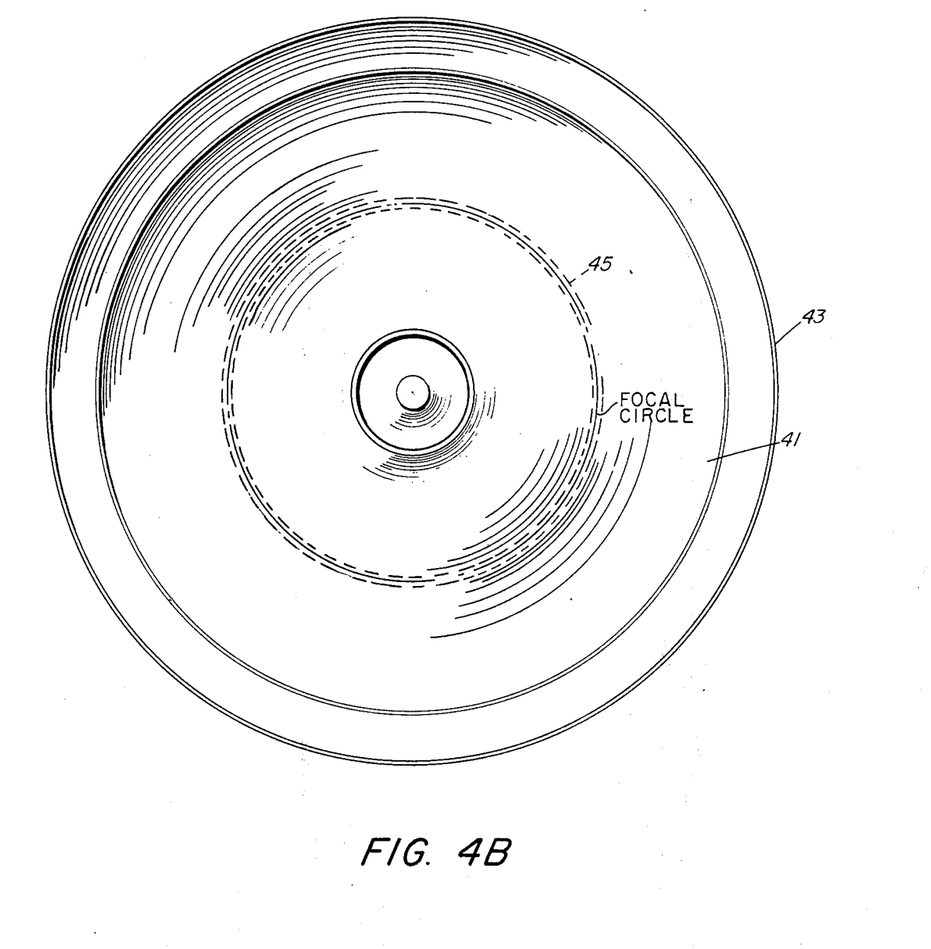
FIG. 4B is a cross-sectional sketch of the alternative embodiment of confocal Rambauske mirrors shown in FIG. 4.

Referring now to FIGS. 4, 4A and 4B, it may be seen that portions of any two of the parabolas shown in FIG. 1A may be utilized as generatrices (rotated around an axis of symmetry not intersecting either parabola but substantially parallel to their common principal axis) of a pair of Rambauske mirrors 41, 43. Such mirrors are adapted to direct light from a ring source, as a fluorescent lamp 45. All light from the fluorescent lamp 45 is reflected back and forth between the Rambauske mirrors 41, 43 in passing toward the aperture (not numbered) formed between such mirrors. The emergent beam, then, is similar to the emergent beam described hereinbefore. That is, the direction of all rays in the emergent beam from the aperture of the arrangement shown in FIG. 4 approaches the direction of an ideal ray.

Figure 4C:
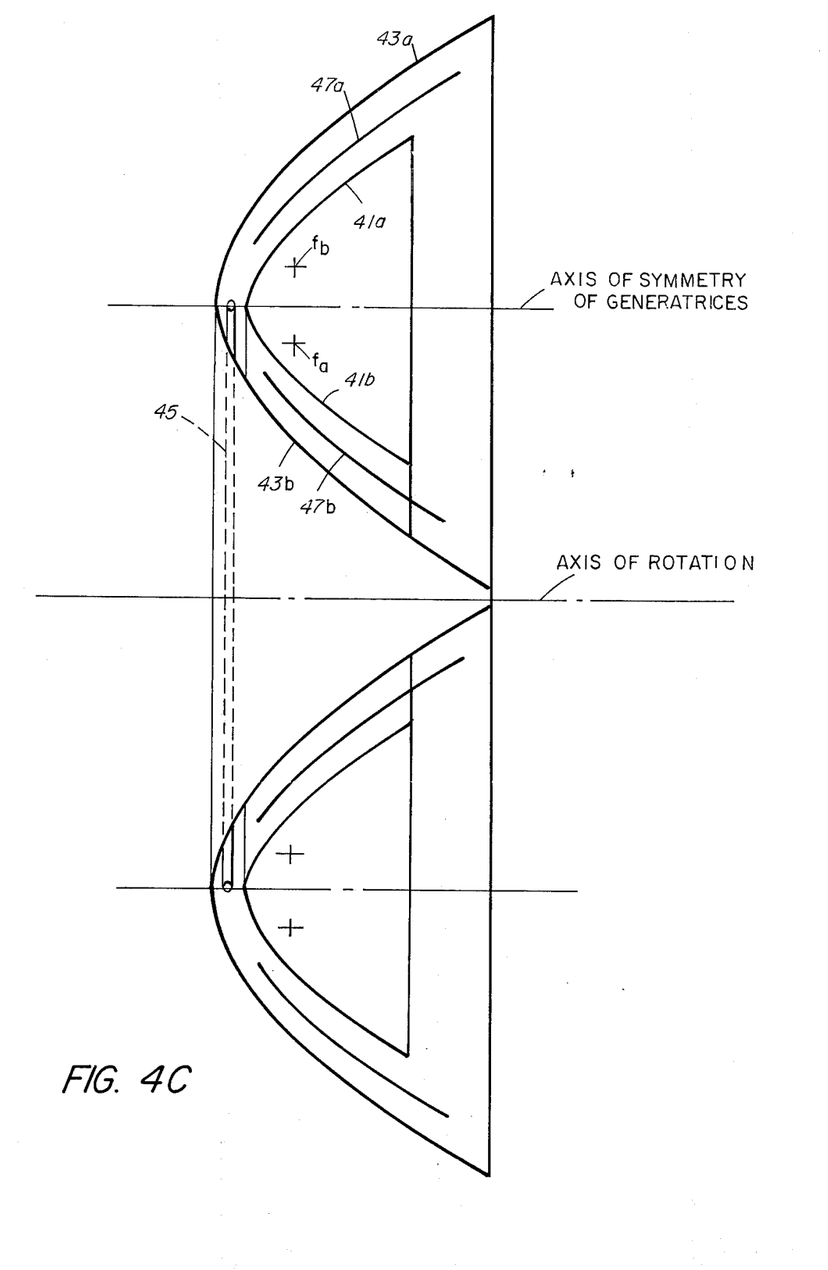
FIG. 4C is a cross-sectional sketch of different confocal Rambauske mirrors usable in the embodiment shown in FIG. 4.

It will be noted that the light emerging from the arrangement shown in FIG. 4 is contained in a pair of coaxial hollow cylindrical beams and in a pair of coaxial conical beams, the rays in all such beams differing, in direction, to some degree from ideal rays. To eliminate one or the other of such pairs of beams (or to adjust the relative amount of light between such pairs), the light of one of the mirrors may, as noted hereinbefore, be changed. Also, if it be desired to provide pairs of Rambauske mirrors not having coincidental normals, the same technique as shown in FIG. 1 may be used. That is, the parabolic generatrices of the reflecting surfaces need not contain the vertices of the parabolas. That is, the Rambauske mirrors shown in cross-section in FIG. 4A may be modified as shown in FIG. 4C. Thus, parabolic generatrices 41a, 43a, 47a (having a common focal point $f_a$) and parabolic generatrices 41b, 43b, 47b (having a common focal point $f_b$) are rotated around an axis of rotation. The focal points $f_a$, $f_b$, then, form two concentric focal circles and the reflecting surfaces correspondingly form divergent toric passages. For reasons set forth hereinbefore in connection with FIG. 1, there are no coincident normals between the reflecting surfaces of the embodiment shown in FIG. 4C, so all light from a ring source (as a fluorescent lamp 45) disposed between Rambauske mirrors 41a, b and 43a, b passes through such divergent toric passages.

It will be noted here in passing that the number of confocal Rambauske mirrors may vary from Figure to Figure. Such change is for convenience in illustrating the principles of the invention. In a practical case, the number of Rambauske mirrors may be increased as desired (if diffraction at the exit aperture may be neglected) to limit the angular divergency between an ideal ray and the "most aberrant" emergent ray.

Figure 5:
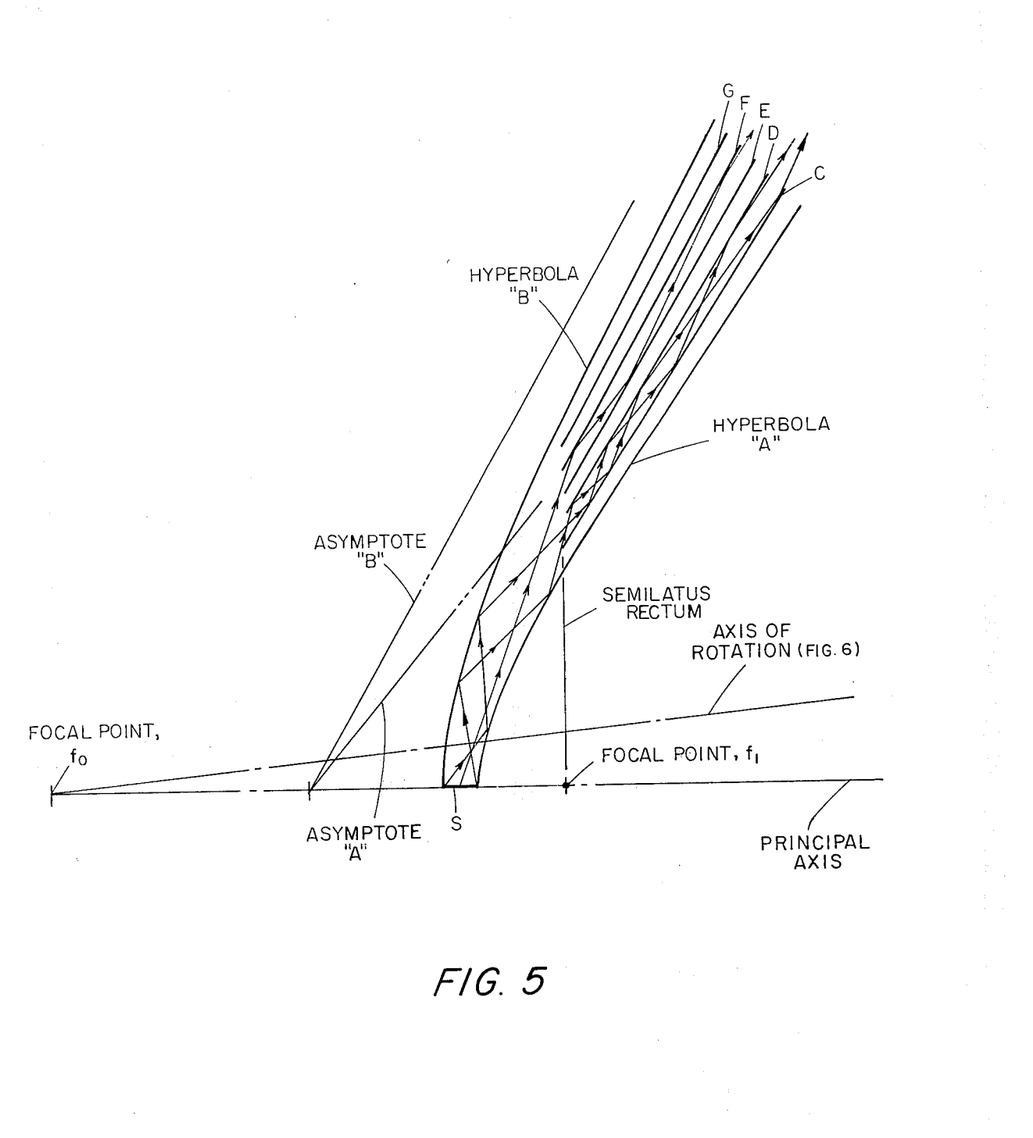
FIG. 5 is a sketch illustrating hyperboloidal generatrices according to this invention, such generatrices being selected from a family of confocal hyperbolas.

Referring now to FIG. 5, it may be seen that sections of confocal hyperbolas may be used as the generatrices for Rambauske mirrors according to this invention. Thus, sections of confocal hyperbolas A and B (which have respectively asymptotes A and B) may be assumed. Exemplary rays (not numbered) from a source S would be reflected back and forth between opposing concave and convex hyperbolas as shown in FIG. 5. In order to increase the number of reflections additional sections of hyperbolas C, D, E, F, G may be disposed between sections of hyperbolas A, B. It is noted again that there is no requirement, other than diffraction or space requirements, to limit the number of, or spacing between, the additional sections of hyperbolas. In this case the rays last reflected from any concave hyperbola appear to originate nearer confocal point $f_0$ than the source S, while rays last reflected from any convex hyperbola appear to have originated at a point nearer confocal point $f_1$ than the source S. In either case, divergent beams are obtained. If it be desired to have all emergent rays apparently originate at a point near only one of the focal points $f_0$, $f_1$ the lengths of the hyperbolas may be adjusted relative to each other.

Figure 6:
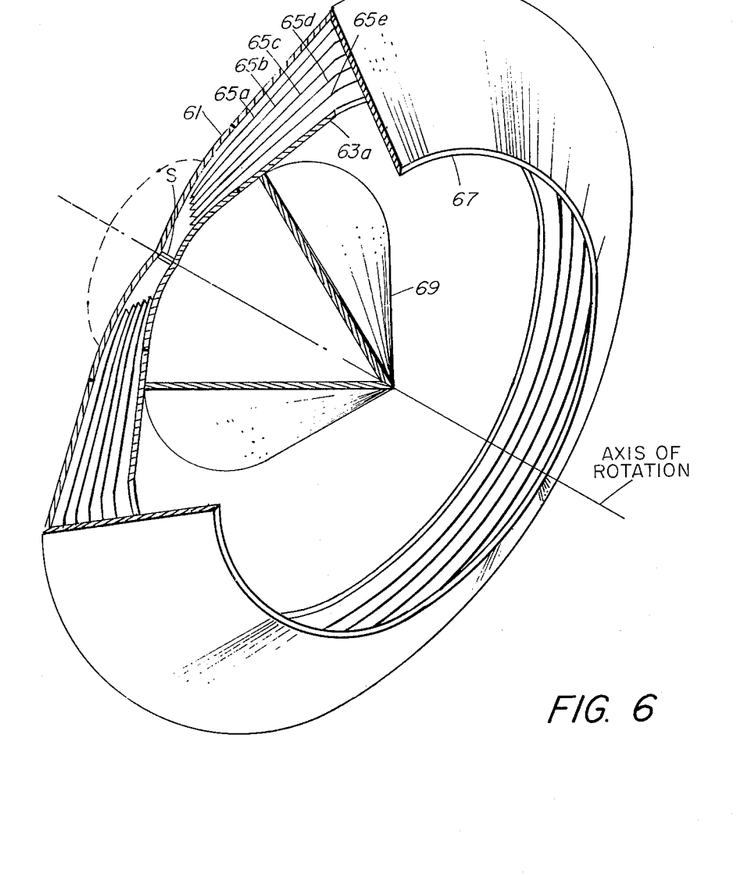
FIG. 6 is an isometric view, partially cut away, illustrating confocal hyperboloidal Rambauske mirrors in combination with divergent conical mirrors and beam directing mirrors to form a beam from the light emitted by an incandescent lamp.
Figure 6A:
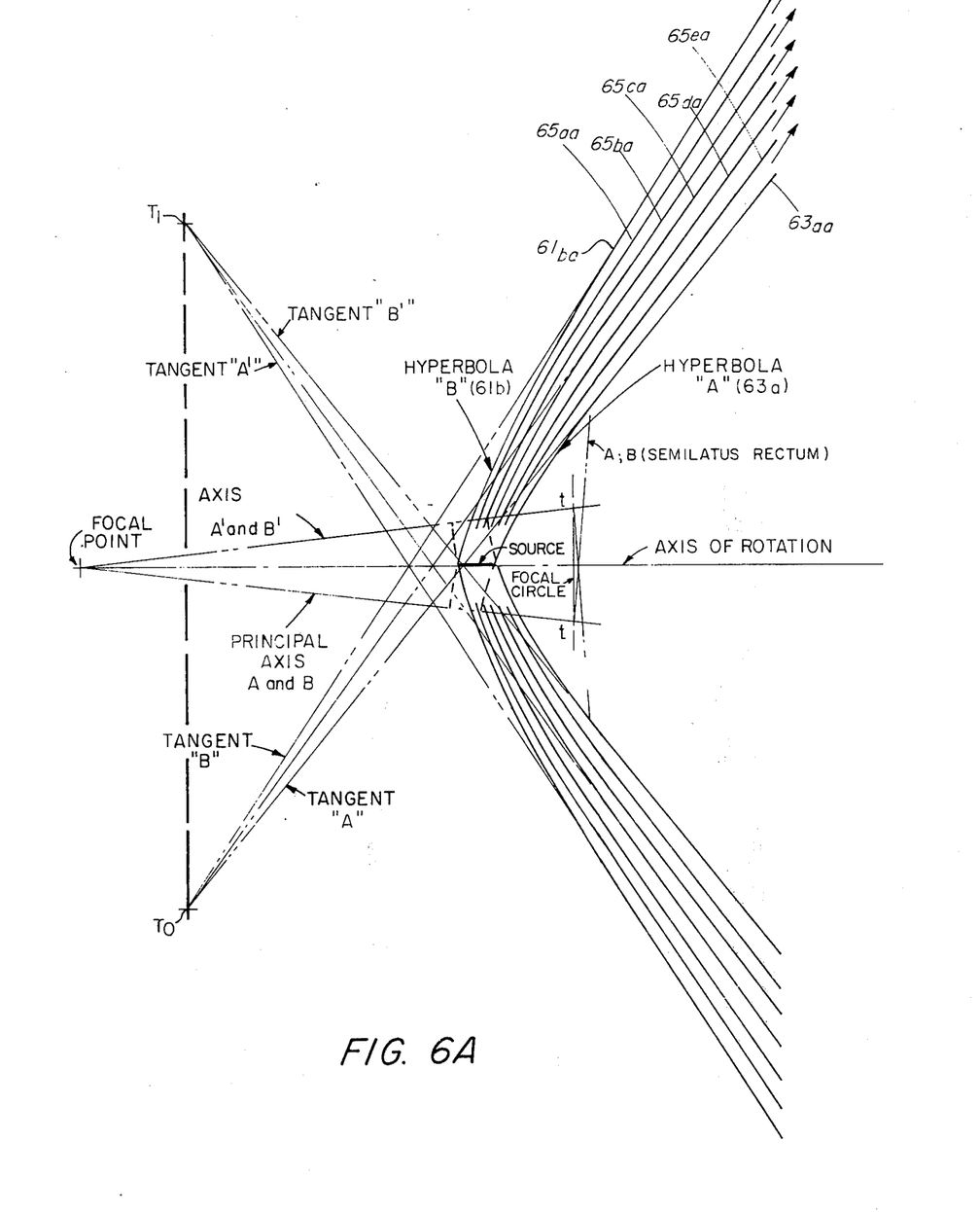
FIG. 6A is a cross-sectional sketch of the confocal hyperboloidal Rambauske mirrors anc conical mirrors shown in FIG. 6.

Referring now to FIGS. 6 and 6A, it may be seen that the hyperbolic generatrices of FIG. 5 may be modified and the resulting Rambauske mirrors may be combined with conventional afocal mirrors. The result of such a combination is to produce a slightly divergent beam from an extended source. Thus, sections of hyperbolas A and B (FIG. 5) may be rotated about an axis of rotation inclined with respect to their common principal axis to produce Rambauske mirrors 61a, 61b. A source of light, as an incandescent filament S, (FIG. 6) is disposed between the vertices of the Rambauske mirrors 61a, 63a. Conical mirrors 61aa, 63aa are faired into the ends of the Rambauske mirrors 61a, 63a. Additionally, sections of confocal hyperbolas (not shown in FIG. 5) are rotated around the axis of rotation to generate, as shown in FIGS. 6 and 6A, Rambauske mirrors 65a, 65b, 65c, 65d, 65e between Rambauske mirrors 61a, 63a. The intermediate Rambauske mirrors are reflective on both sides. Conical mirrors 65aa, 65ba, 65ca, 65da, 65ea (each being reflective on both sides are here faired into Rambauske mirrors 65a through 65e (rather than the confocal Rambauske mirrors which would have resulted had the hyperbolic sections C, D, E, F, G (FIG. 5) been used as generatrices). As shown more clearly in FIG. 6A, the confocal mirrors 61aa, 63aa, 65aa, 65ba, 65ca, 65da, 65ea are divergent from each other and from the conical mirrors 61ba, 63aa. The divergence angle between each successive pair of conical mirrors 61ba, 65aa, 65ba, 65ca, 65da, 65ea, 63aa is such that, if extrapolated as indicated for conical mirrors 61a, 65b, 63a in FIG. 6A, the extrapolations of all of the conical mirrors being discussed would intersect on a circle (not numbered). That circle: (a) is centered on the axis of rotation; (b) is in a plane orthogonal to such axis; and (c) has a diameter as indicated by points $T_0$, $T_1$. These latter points in turn are defined by the intersections of the tangents to the Rambauske mirrors 61b, 63a, 65a, 65b, 65c, 65d, 65e from the points where such mirrors are faired into the conical mirrors.

To complete the contemplated arrangement in FIG. 6 a conventional annular mirror 67 and exit mirror 69 are disposed to redirect light emerging from between the conical mirrors 61a, 63a, 65a, 65b, 65c, 65d, 65e. Here the reflecting surface of the annular mirror 67 is a frustrum of a right circular cone and the reflecting surface of the exit mirror 69 is a right circular cone. The half-apex angles of the two just mentioned cones are calculable knowing the inclination, with respect to the axis of rotation of the middle one of the conical mirrors 65aa.....ae, i.e. the inclination of conical mirror 65ca. If it be assumed that the half-apex angle of the exit mirror 69 is to be 45°, then the half-apex angle of the annular mirror 67 would be 135° less one-half the inclination of conical mirror 65c.

In the portion of the disclosed arrangement encompassed by the confocal Rambauske mirrors 61a, 61b, all rays from the source are reflected at least once. Therefore, regardless of the initial direction of any ray, after its last reflection from any one of the Rambauske mirrors, the apparent origin of the rays is closer to either one of the foci of the hyperbolic generatrices. The amount of such shift for any ray is dependent mainly upon initial direction, the number of reflections undergone in passing between any pair of Rambauske mirrors and the shape (convex or concave) of the last reflecting surface from which the ray is reflected. The number of reflections, in turn, is determined by the spacing between, and the length of, the Rambauske mirrors. In any event, it may be seen that all rays, regardless of their initial direction, are reflected to pass through one of the exit apertures formed by the Rambauske mirrors, the direction of each ray being such that it is a part of a diverging beam apparently originating near one of the foci of the Rambauske mirrors. During passage between the conical mirrors 61ba, 63aa, 65aa through 65ea, rays that appear to have originated adjacent to the focal circle of the Rambauske mirrors 61a, 61b, 65a through 65c are reflected back and forth between a pair of such conical mirrors. After each reflection, because the conical mirrors are always diverging, the direction of each ray approaches parallelism with the arrow (not numbered) at the exit aperture between each pair of such mirrors. These arrows, if projected backward, intersect (FIG. 6A) at points $T_0$, $T_1$. Similarly, rays apparently originating adjacent to the focal point of the Rambauske mirrors are reflected back and forth between the conical mirrors 61*ba*, 63*aa*, 65*aa* through 65*ea*, to approach parallelism with the corresponding arrow shown at the exit aperture of such mirrors. It follows then that the rays emerging from the exit apertures between the conical mirrors 61*ba*, 63*aa*, 65*aa* through 65*ea* apparently originate at points adjacent to the circle $T_0$, $T_1$. As shown in FIG. 6, such emergent rays are redirected into a conical beam having a smaller half-apex angle by the annular mirror 67 and the exit mirror 69.

It will be observed that the afocal mirrors shown in FIG. 6 are not as effective as the Rambauske mirrors in the causing rays from the source to approach the direction of ideal rays. That is, the afocal mirrors are relatively ineffective in correcting aberrations. A moment's thought will make it clear, however, that if it be desired to reduce aberrations, the Rambauske mirrors 61, 63, 65*a* through 65*e* could be extended to take the place of the conical mirrors 65*aa* through 65*ea* and that the annular mirror 67 and exit mirror 69 could be replaced by one or more appropriate Rambauske mirrors. Thus, if the Rambauske mirrors 61, 63, 65*a* through 65*e* were to be extended so that all of the rays emerging from between such mirrors appear to have originated adjacent to the focal circle (FIG. 6A) of the generatrices the annular mirror 67 could be replaced by a concave Rambauske paraboloidal mirror having a focal circle coincident with the focal circle of such generatrices. The exit mirror 69 would then not be required because all rays falling on the concave Rambauske paraboloidal mirror would be substantially in parallelism with the principal axis of such paraboloidal mirror.

Having described different embodiments of this invention, it will now become apparent to those of skill in the art that the principle of using Rambauske mirrors with always divergent reflecting surfaces to reflect light a number of times in its passage through such mirrors may be incorporated in many embodiments, not illustrated. For example, it will be evident that the Rambauske mirrors, especially those which are required to be reflective on both sides, may be easily formed by application of a metallic film on an appropriately shaped transparent base, using any conventional technique. Further, it will be obvious that the particular light source in any one of the illustrated embodiments may be changed. Thus, it is not essential to have a light source disposed along the axis of rotation as, for example, the light sources shown in FIGS. 1 and 6, nor is it essential that either a light source or a link source be used as shown in other Figures. That is, according to this invention a number of discrete sources may be used in any embodiment. Further, it will be evident that because the principles of reciprocity apply, catoptric lens arrangements according to this invention may be used as directional receivers of wave propagated energy. That is, the source of light could be replaced by appropriate sensors to detect wave propagated energy incident on the exit aperture of any of the disclosed embodiments within a given solid angle. Still further, it will be evident that, although all illustrated embodiments of this invention utilize wave propagated energy in the feasibility portion of the electromagnetic spectrum, catoptric lens arrangements according to this invention may be used with sources of other types of wave propagated energy, as radio frequency energy or sonic energy.

It is felt, therefore, that this invention should not be restricted to its disclosed embodiments, but rather should be limited only by the spirit and scope of the appended claims.

We claim:

1. A beam forming arrangement for forming a beam of wave propagated energy from the energy emitted by a source thereof, such arrangement comprising:
   a. at least a pair of mirrors having a common focal curve disposed around an axis of symmetry, one of such mirrors having a concave reflecting surface and the other having a convex reflecting surface to define a divergent channel for wave propagated energy, one of such mirrors being interposed between such channel and the common focal curve of such mirrors; and
   b. a source of wave propagated energy disposed between the confocal mirrors and within the divergent channel adjacent to the narrowest part thereof.

2. A beam forming arrangement as in claim 1 wherein the cross-sectional shapes of the reflecting surfaces of each one of the pair of mirrors are segments of confocal parabolas having a common principal axis.

3. A beam forming arrangement as in claim 2 wherein the principal axis of the confocal parabolas is parallel to the axis of symmetry.

4. A beam forming apparatus as in claim 3 wherein the principal axis of the confocal parabolas is inclined with respect to the axis of symmetry.

5. A beam forming arrangement as in claim 3 wherein the lengths of the mirrors vary.

6. A beam forming arrangement as in claim 1 wherein the reflecting surfaces of the mirrors are segments of confocal hyperbolas.

7. A beam forming arrangement as in claim 6 wherein the principal axis of the confocal hyperbolas is parallel to the axis of symmetry.

8. A beam forming apparatus as in claim 6 wherein the principal axis of the confocal hyperbolas is inclined with respect to the axis of symmetry.

9. A beam forming arrangement as in claim 6 wherein the lengths of the confocal mirrors vary.

* * * * *